United States Patent
Adams (10) Patent No.: US 8,701,340 B2
(45) Date of Patent: Apr. 22, 2014

(54) METHODS AND APPARATUS FOR IMPROVING PLANT GROWTH

(76) Inventor: Arthur Henry Adams, Pasadena, CA (US)

( * ) Notice: Subject to any disclaimer, the term of this patent is extended or adjusted under 35 U.S.C. 154(b) by 0 days.

(21) Appl. No.: 13/027,935

(22) Filed: Feb. 15, 2011

(65) Prior Publication Data

US 2011/0314732 A1 Dec. 29, 2011

Related U.S. Application Data (63) Continuation of application No. PCT/US2010/001866, filed on Jun. 29, 2010.

(60) Provisional application No. 61/269,779, filed on Jun. 29, 2009.

(51) Int. Cl.
*A01G 7/00* (2006.01)

(52) U.S. Cl.
USPC .................................. 47/1.01 R; 47/58.1 LS (58) Field of Classification Search
USPC ....... 47/39, 41.1, 42–47, 58.1 R, 58.1 LS, 58, 47/DIG. 8, DIG. 12, 1.3; 40/411, 414, 421, 40/423
See application file for complete search history.

(56) References Cited

U.S. PATENT DOCUMENTS

| | | | | |
|---|---|---|---|---|
| 3,635,185 A | * | 1/1972 | Kojima | 104/56 |
| 3,740,557 A | * | 6/1973 | Kaushansky et al. | 378/67 |
| 3,882,634 A | * | 5/1975 | Dedolph | 47/65 |
| 4,250,666 A | * | 2/1981 | Rakestraw | 47/83 |
| 4,781,119 A | * | 11/1988 | Davis | 104/93 |
| 5,759,107 A | * | 6/1998 | Nagel | 472/47 |
| 5,966,935 A | * | 10/1999 | Liu | 60/413 |
| 6,792,872 B1 | * | 9/2004 | Valdespino | 104/22 |

FOREIGN PATENT DOCUMENTS

JP 2002010712 A * 1/2002 ............... A01G 7/00

OTHER PUBLICATIONS

International Search Report, from corresponding PCT application. PCT/US2010/001866.
Written Opinion of the International Searching Authority from corresponding PCT application. PCT/US2010/001866.

* cited by examiner

*Primary Examiner* — David Parsley
*Assistant Examiner* — Danielle Clerkley
(74) *Attorney, Agent, or Firm* — Sughrue Mion, PLLC

(57) ABSTRACT

A mechanical device including two concentric space frame structures is used to enhance plant growth. Essentially identical in shape but with the inner space frame smaller than the outer by a 4:5 relationship the space frame structures independently rotate about a common axes line. Each space frame consists of a right square pyramid of rods with its apex pointing upward and a second similar pyramid directly below it by a distance approximately two and one half times the length of each rod comprising the pyramid. The second, lower pyramid however has its apex pointing downward and is turned 45-degrees about a line connecting the two apex points. Eight additional rods complete each space frame. They each, respectively connect a corner of the upper pyramid base to a corner of the lower pyramid base in a manner that is symmetric.

18 Claims, 14 Drawing Sheets

METHODS AND APPARATUS FOR IMPROVING PLANT GROWTH

CROSS REFERENCE TO RELATED APPLICATIONS

This application is a continuation application of PCT US2010/001866 filed Jun. 29, 2010 designating the U.S. and claims priority from U.S. provisional application 61/269,779 filed Jun. 29, 2009. These two applications are both hereby incorporated herein by reference in their entirety.

FIELD

These teachings involve equipment and methods for horticultural and agricultural productivity enhancement.

BACKGROUND

The field of cultivating plants has spurred technological advances from the plow, to artificial irrigation, to hybridization and now to advances in the application of DNA research. In the area of subtle influences that alter a plants environment, some have experimented with "talking to their plants" and playing Mozart for them. While neither of those techniques has found widespread use, there is a growing body of serious research regarding the effects of sound and vibrations on plant growth. Like all living organisms, plants have highly complex sensory networks for monitoring their surroundings, and are known to modify their growth and development to suit their environment. For example, plants exposed to a variety of mechanical perturbations, such as wind or touch, undergo physiological and developmental changes that enhance resistance to subsequent mechanical stress. Developmental changes in response to mechano-stimulation are collectively known as thigmomorphogenesis.

Figure 1A:
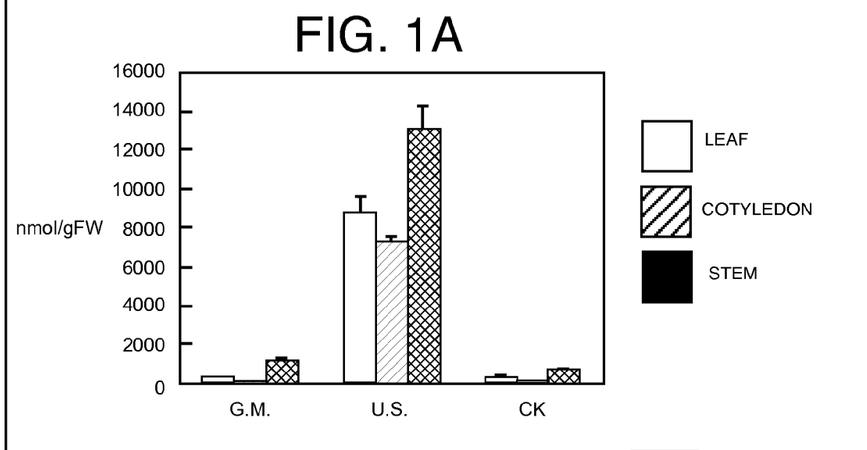
FIGS. 1A and 1B together constitute a re-drawing of FIG. 1 of the paper of Yu-Chuan Qin, et al.
Figure 1B:
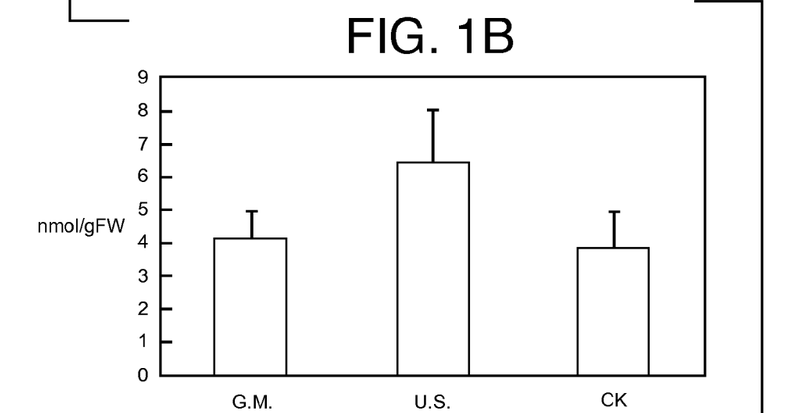

The short paper "Biochemical and physiological changes in plants as a result of different sonic exposures" by Yu-Chuan Qin, Won-Chu Lee, Young-Cheol Choi and Tae-Wan Kim that was published in Elsevier's Ultrasonics journal (41 (2003) 407-41) investigates the biochemical mechanisms that might be involved in some of these phenomena. Chinese cabbage and cucumbers at two growth stages were the researchers' subjects. For each plant type three groups were constituted. Besides a control group that was not subject to any artificial acoustic treatment, one group was exposed to steady ultrasonic (US) waves of 20 k Hz, while the other was exposed to so-called "green music" (GM) consisting of a combination of classical music and natural sounds including bird songs. Both $O_2$ intake and polyamines content were measured. In brief, they found Chinese cabbage reacting more positively to the GM and the cucumbers to the US. However, for each quantity measured, either one or the other or both of the sonically exposed plants had greater readings than those of the control plants. That paper's charts of the polyamines content measurements are reproduced as FIGS. 1A and 1B. The caption of the Chinese cabbage growth graph in that paper is:

"Polyamine content (nmol/gFW) of Chinese cabbage seedlings: (A) 15 d and (B) mature plant (70 d) as a result of different acoustic exposures. Error bars represent the standard deviations of the means of polyamine contents." And the caption in that paper of the cucumber data is: "Polyamine content (nmol/gFW) of cucumber seedlings: (A) 15 d and (B) mature plant (70 d) as a result of different acoustic treatments. Error bars represent the standard deviations of the means of polyamine contents."

Studies have also focused on specific frequencies' effects, for example "Plant gene responses to frequency-specific sound signals", Mi-Jeong Jeong, Chang-Ki Shim, Jin-Ohk Lee, Hawk-Bin Kwon, Yang-Han Kim, Seong-Kon Lee, Myeong-Ok Byun and Soo-Chul Park. (Mol Breeding (2008) 21:217-226) published Springer's Molecular Breeding journal. They demonstrated sound affecting plant growth through mRNA expression analyses.

Others have looked at the issue of the effect of vibration on plant growth. One relevant article is: "Growth Promotion by Vibration at 50 Hz in Rice and Cucumber Seedlings", Hideyuki Takahashi, Hiroshi Suge and Tadashi Kato. (Plant Cell Physiol. 32(5): 729-732 (1991)). They looked at the effect of 50 Hz vibration and mention that a motivation of their study was the issue that motors and other mechanical apparatus in a green house might produce sounds with unintended and unexpected effects on plants.

Figure 3:
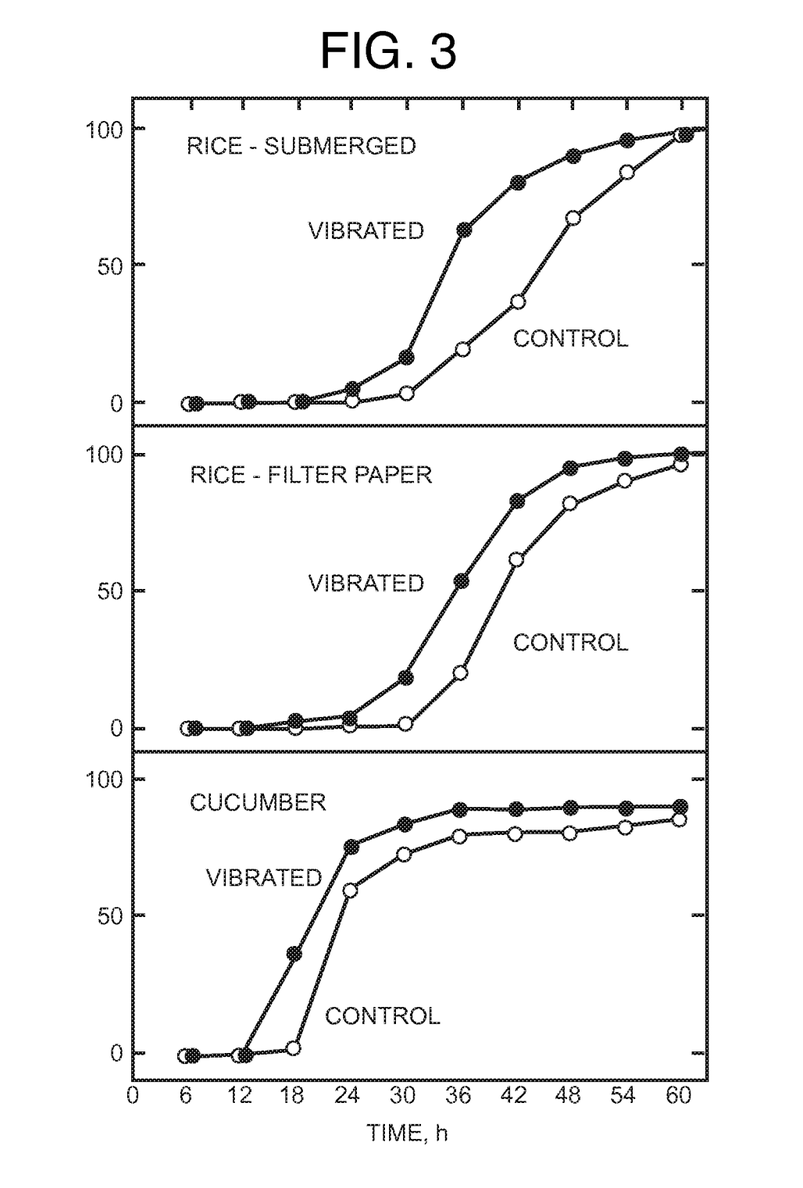
FIG. 3 is a re-drawing of FIG. 1 of the paper of Hideyuki Takahashi, et al.

FIG. 3 shows a reproduction of that paper's "FIG. 1." Its caption is:

"Germination of rice and cucumber seeds as affected by vibration at 50 Hz Data is shown as the percentage of germinated seeds in a time-course study. Top (A), rice seeds under submerged conditions; middle (B), rice seeds on filter paper; bottom C), cucumber seeds on filter paper. Open (○) and closed (●) circles indicate the control and the vibrated seeds, respectively. One hundred seeds were used for each treatment."

U.S. Pat. No. 7,600,343 dated Oct. 13, 2009 by Reiner Schultheiss, et al, discusses the effect of shock waves on plant growth.

However, previous attempts to improve plant growth along the lines of the research above have not made it into routine, large-scale, commercial use. Systems and methods are needed which can improve plant growth in ways compatible with our current environmental imperatives that are also inexpensive to deploy and maintain. Preferably, solutions would avoid chemical fertilizers and chemical pesticides and be simple to deploy in both the developed world and the developing world.

SUMMARY

System and methods consistent with these teachings involve two counter-rotating geometric space frame structures that may be thought of as concentric. When energized and operated proximate to growing plants, the growth rate of those plants can be enhanced. Experimental results have shown its operation to be associated with effective increase in plant growth.

DETAILED DESCRIPTION

Introduction

The global population is estimated to reach 9 billion people by 2050. There is an increasing loss of arable land caused by desertification and decreasing water supplies caused by melting glaciers and erratic precipitation patterns. It may be difficult to feed the world's population in the future. Equipment and methods to enhance plant growth are therefore of high global importance.

Structure

Figure 4:
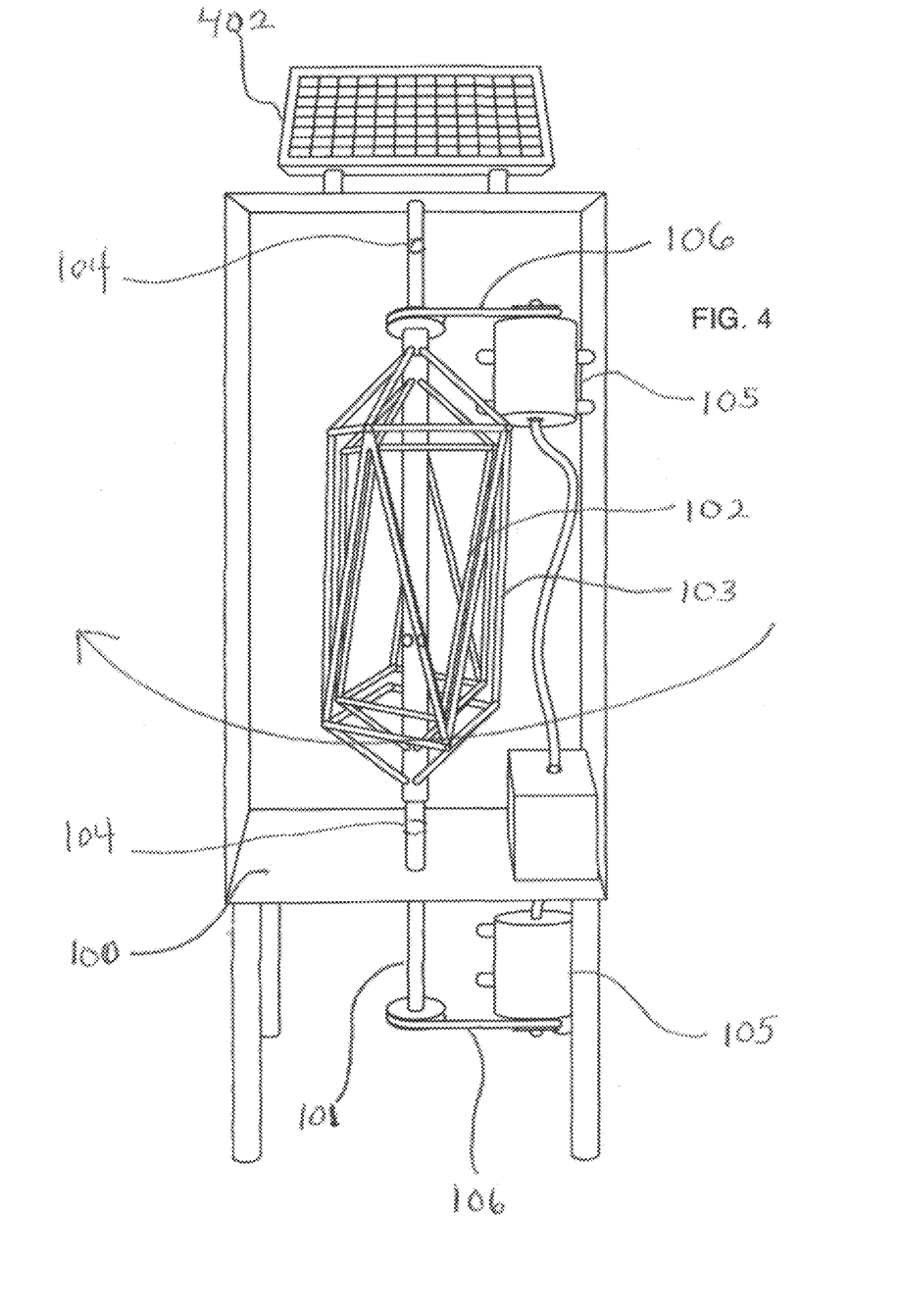
FIG. 4 shows a perspective view of the first example embodiment.

In a first example embodiment seen in FIG. 4, a machine includes a platform 100 supporting a vertical axle 101. Rotatably coupled to the axle are an inner armature 102 and an outer armature 103. Each of these armatures is supported by respective bearings 104 and are arranged to separately, freely rotate about the axle. A source of motive force in this example, are two DC motors 105 and are mechanically connected by belt drives 106 to each armature to provide for their respective rotation in opposite directions. In this first example device, the outer armature 103 revolves clock-wise with the inner armature 102 going counter-clockwise. The relative rotation of the armatures is not set to a fixed relationship by mutual gearing, for example. The motors are capable of being adjusted to cause each armature to rotate in a range of 400 to 500 rotations per minute. In this example the upper surface of the top supports a solar cell panel 402 that provides the energy to operate the motors. Those skilled in the art will be familiar with the specific current requirements of various motors that may be used and the energy storage than may be required. In this example the electricity from the solar panels is used to charge batteries. The motors, under the control of a timer and speed controllers, is then driven from the batteries.

Armatures

The inner and outer armatures of this version are each a geometric frame constructed from stainless steel rods. Aluminum rods may also be used. The armatures are of the same geometric configuration with the difference being that the outer armature 103 is a scaled up instance of the configuration of the inner armature 102. Therefore the inner armature will be initially described in isolation. This also allows for clearer drawings than those showing the entire machine.

Inner Armature

Figures 5, 6:
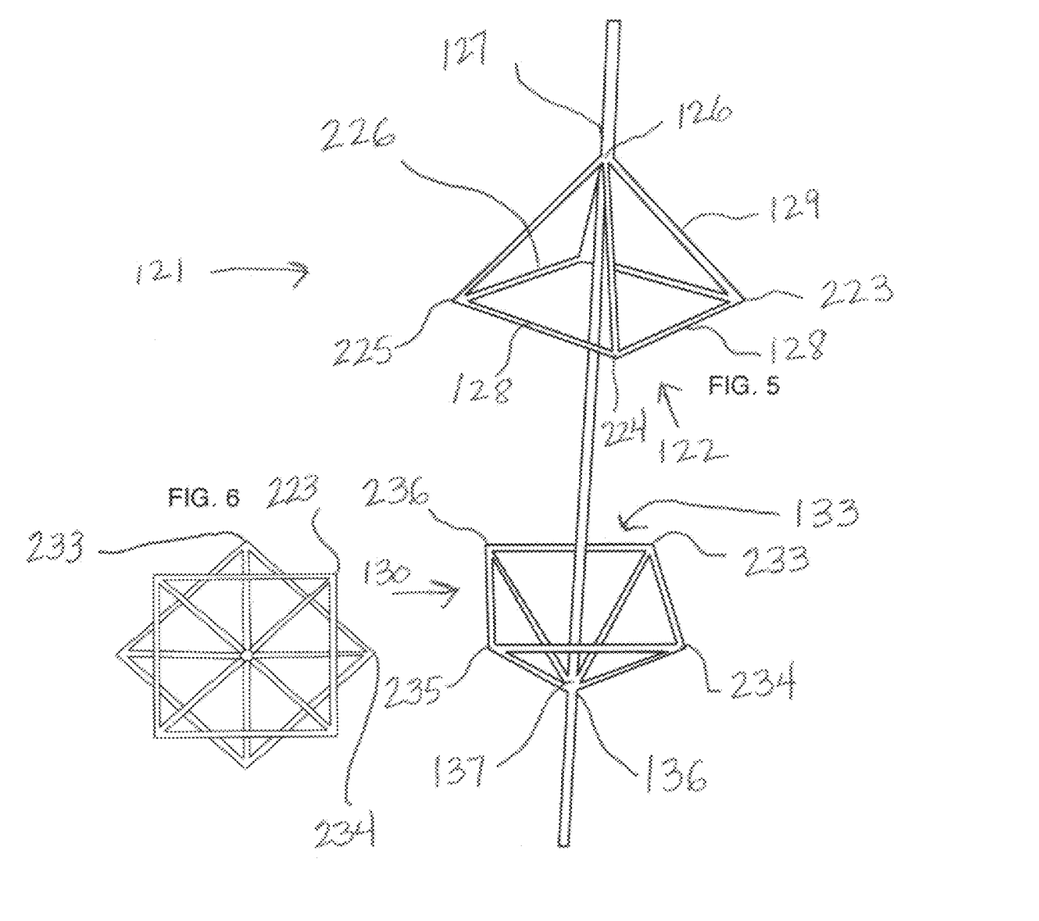
FIG. 5 shows a perspective view of upper and lower pyramids of the inner armature of the unit of FIG. 4 in isolation.
FIG. 6 shows a plan view of the armature components of FIG. 5.

Its height is the dimension that would be from its top to its bottom when configured on the axle on the platform in a usage configuration. In this first version the inner armature's 102 overall height, is about 28.5 inches. The upper-most and lower-most elements are rods of a diameter of about ⅜", centered within the armature body that fits over the axle. The armature can be thought of as a space frame with its top and bottom portions being symmetrically arranged rectangular, right pyramid space frames. To allow this description to be more meaningful, the lengths of the space frame rods will be expressed in relation to the length (L) of the rods that make up the upper and lower pyramids. For this inner pyramid L is 9". As seen in FIG. 5, the upper, inner pyramid 121 has a base 122 that is formed by four rods of length L 128 arranged to represent the sides of a square. From each corner 223 224 225 226 of that base is a rod 129 representing a vertex of the pyramid. The rods' other ends all meet near an apex 126. In this case the vertices rods' are also of length L. These identical lengths of base and vertex segments result in a shape with faces that are at about 52 degrees to the plane of the base.

The upper pyramid, 121 as mentioned, is complimented by an identical lower pyramid 130 that is of an identical space frame configuration. However, in constituting the armature, the lower pyramid has its apex 136 pointing downward. Its position is symmetric relative to the upper pyramid with the exception of being rotated by 45 degrees about a line connecting the two apex points 126 136. This rotational offset is better seen in FIG. 6 that shows a top plan view of the pyramids of FIG. 5.

Figure 7:
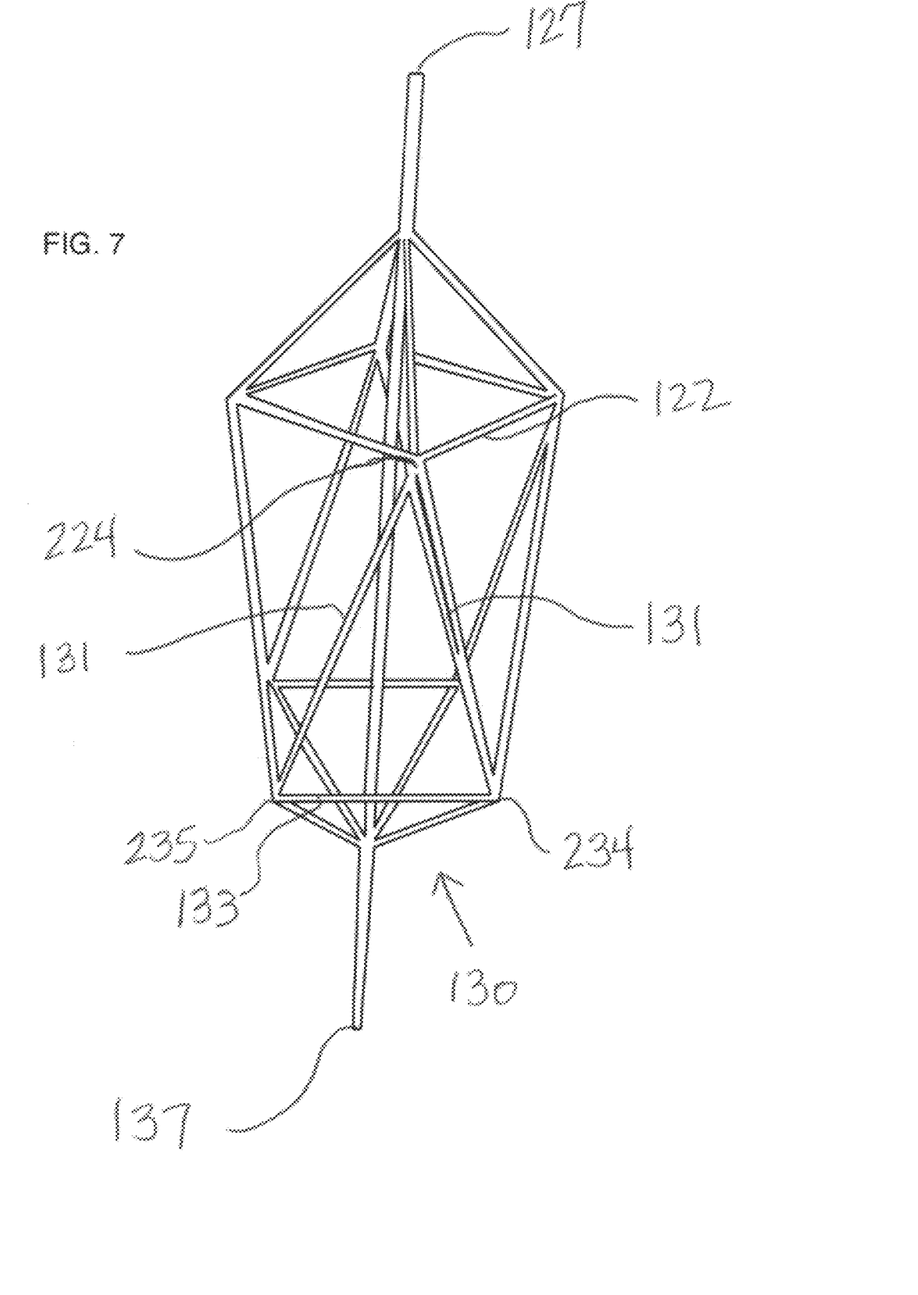
FIG. 7 shows a perspective view of the inner armature from the perspective view as in FIG. 5.

As seen in FIG. 7 as well as other figures, the two pyramids are spaced apart by connecting rods 131 that interconnect the corners of the upper pyramid's base 122 with corners of the lower pyramid's base 133. Each corner is connected to the two nearest corners of the opposing pyramid's base. For example, a particular corner of the upper pyramid 224 has one attached connecting rod 131 whose other end is attached to corner 235 of the lower pyramid 130. A second connecting rod is attached to the same upper pyramid corner 224 and its other end is attached to the lower pyramid at a second corner 234. The six remaining connecting rods are similarly attached to the pyramids creating the symmetric geometric shape of the inner armature. Since the pyramids are rotationally offset, these eight equal length rods take a form of the letter "V". In this example, the length of those rods are all of length 1.8*L. The consequence to these relative rod dimensions is that the height of the pyramids is 0.707*L while the distance between bases is 0.95*L. The total length from apex to apex is therefore (2*1.8+0.95)*L or 3.1*L. As mentioned, the pyramids' respective vertices meet near the apex. In fact, they terminate at the upper and lower support tubes 127 137 respectively. These support tubes are centered on the armature's apex-to-apex centerline.

Figure 8:
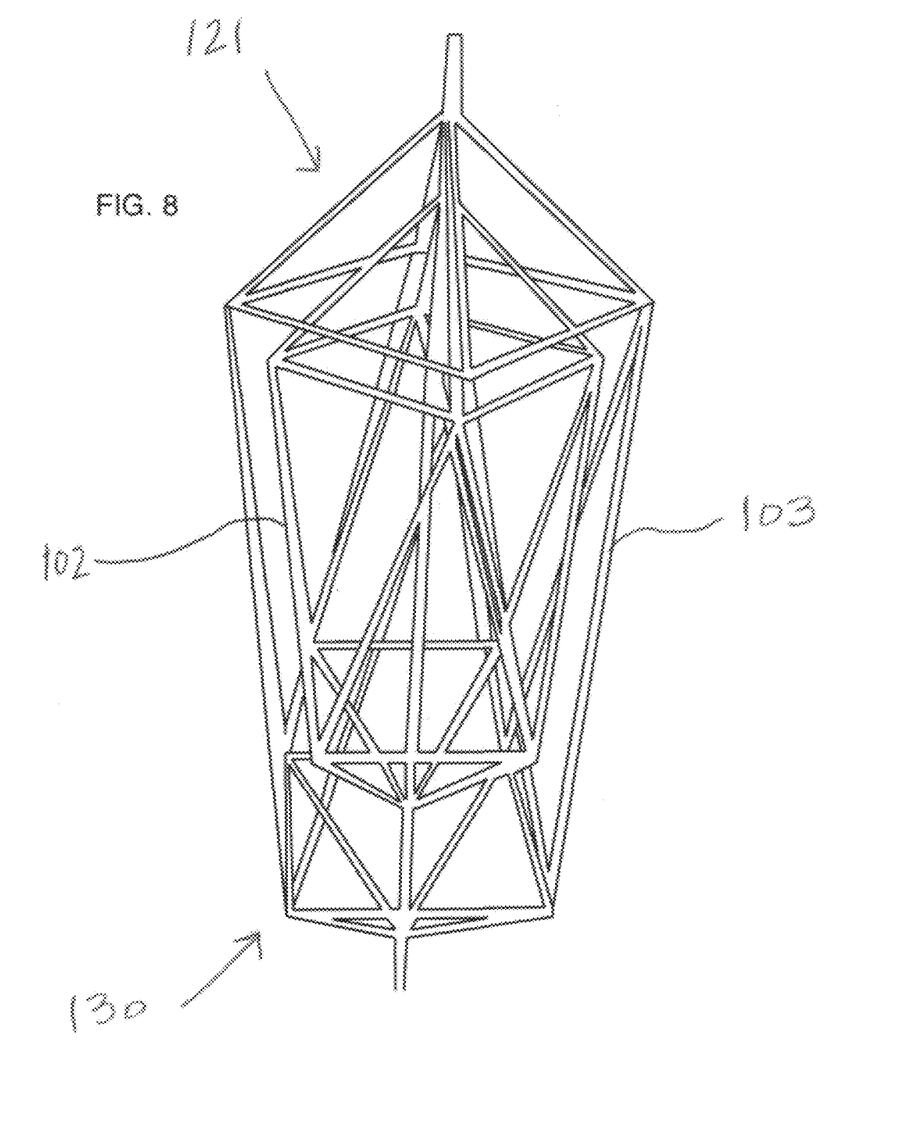
FIG. 8 shows the apparatus of FIG. 7 and shows an identical but larger outer armature.

FIG. 8 shows an inner armature surrounded by an outer armature, both on a common axle through their support tubes. In this version, the outer armature has rods making up its pyramids that are length 11 inches. Bearings support the armatures for rotating on the axle. They provide for independent driving of each armature in their respective rotations. The total height of the dual armature assembly is about 36 inches from apex to apex.

Assembly Method

Figure 9:
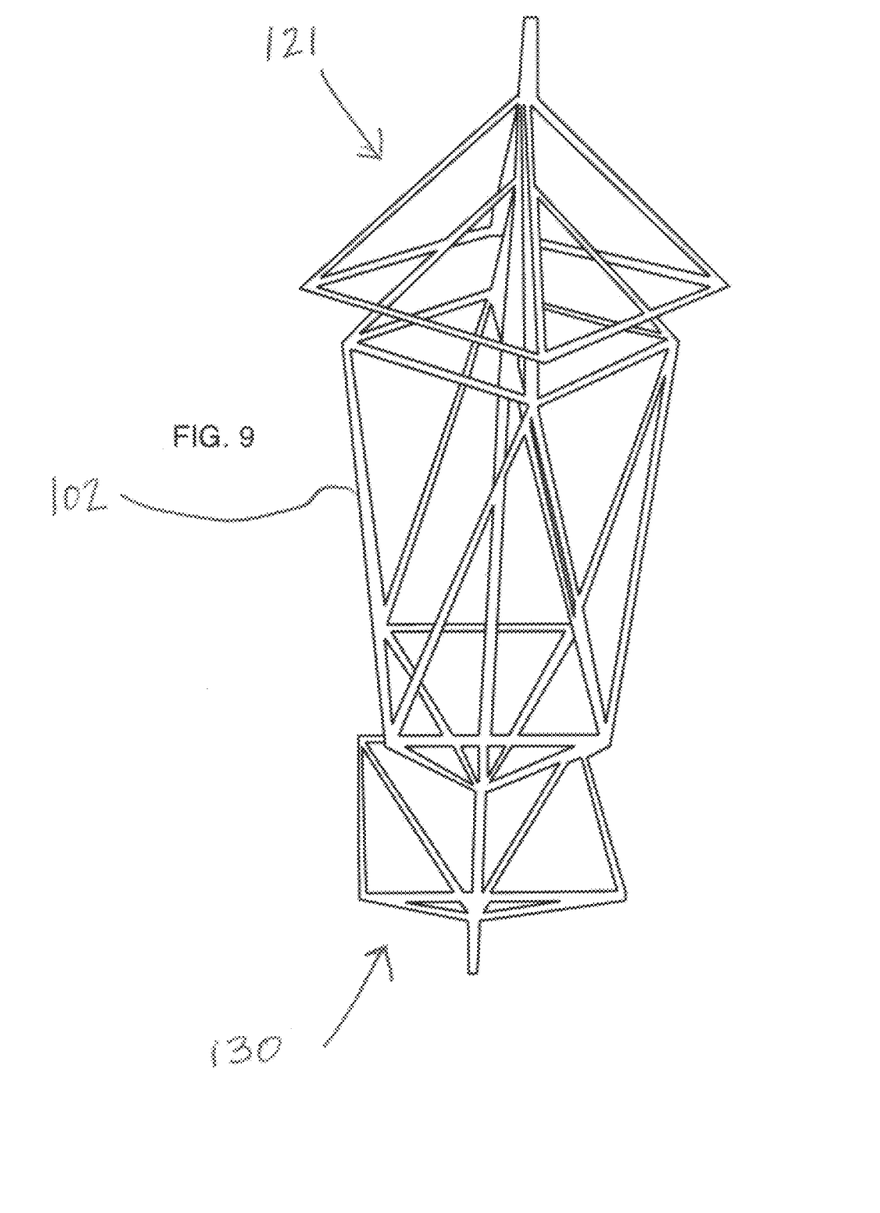
FIG. 9 shows the inner armature of FIG. 7 with the larger pyramids of the outer armature arranged above and below it.

The various rods and pipes that make up most parts of the armatures are welded together in this first example. Since one is completely inside of the other, the outer armature is welded together after being assembled around the inner armature. FIG. 9 shows a partially assembled unit. The outer upper and lower pyramids are in place surrounding the inner armature. The next step would be to weld the outer armature's connecting rods to the appropriate corner locations on the two large pyramids.

Variations

While a solar powered unit may be ideal for field use, motors running on AC mains power might be more suitable for use in a green house or in an indoor hydroponic application. Rather than having a motor for each armature, it is known to those skilled in the art to use a single motor with gearing or other mechanical coupling to have one motive source turn the armatures in opposite directions. The entire unit may be scaled up or scaled down, keeping the proportions constant.

Second Example Embodiment

Figure 10:
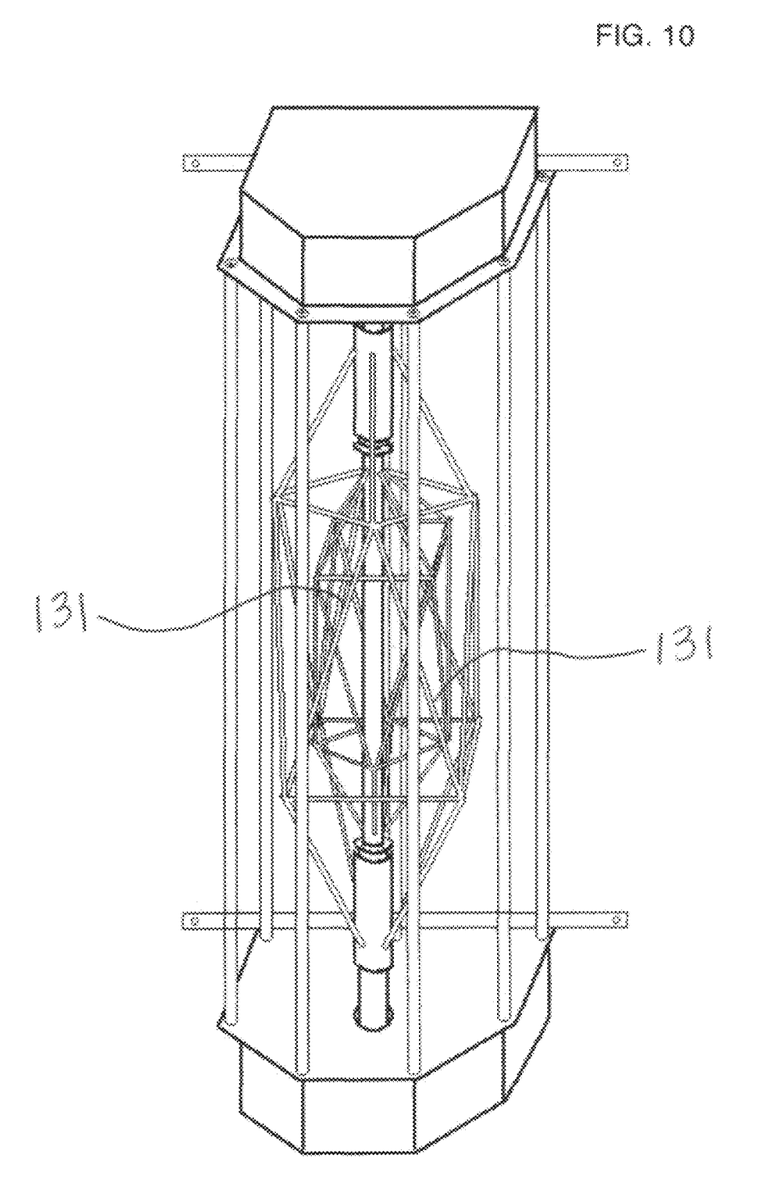
FIG. 10 shows a unit of the second embodiment version.

A similar geometric shape to the first example unit is present in the second example embodiment. However, the second embodiment is intended for indoor use. The armatures rods are each one half the total length of the corresponding structure in the first example. This version is shown in FIG. 10. Rather than a platform and pipes to support it, this unit is in a self-contained cabinet.

Operation

For outdoor operation the embodiment of example one can be supported from the ground by 2-inch galvanized pipes approximately one foot into the ground that support the platform near its four corners. The unit is placed in a field in proximity to the crops to be effected. The solar panel is connected to a battery that, in turn, is connected to a timer and to speed controllers for the two motors. The timers are recommended to be set to operate the apparatus three to five times during daylight hours at equally spaced intervals for equal durations. An example operation is operating for five minutes, three times a day, at intervals that split the daylight hours into four segments. Since the sunlight available is variable, those skilled in the art will recognize the function of the battery in providing a steady source of energy to rotate the armatures at a predetermined rate for a predetermined duration. The rate for each armature respectively can be between 400 and 500 revolutions per minute.

Alternate Modes of Operation

A smaller, indoor unit is bolted to the floor the plants are resting upon. Alternatively it is bolted to a wall that is, in turn, abutting and secured to that floor. An indoor unit would most likely be powered from AC, as mentioned.

AC could also power an outdoor unit. Other modes of powering could be a wind turbine substituting for the solar panels. Another could involve deriving power from the flow of water in an irrigation system.

Experiments to-Date

Outdoors Experiment

Figure 11:
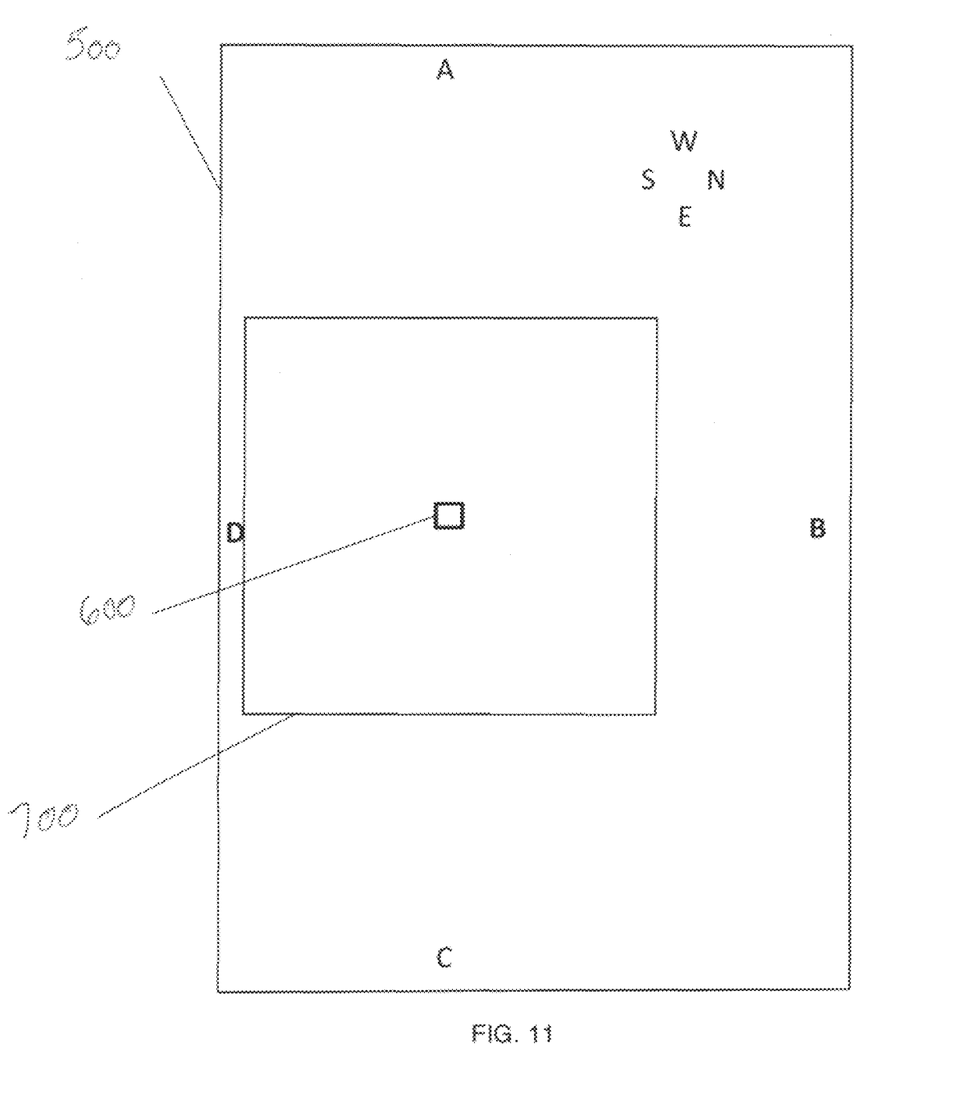
FIG. 11 shows a schematic diagram of a tomato field in which experiments were performed noting location of the test area.

Two primary experiments have been performed. A large-scale outdoor trial was performed at Eclipse Farms in the City of Oxnard, Calif. The crop grown there is Roma tomatoes. A unit 600 constructed as the first example embodiment was installed and operated as discussed in the operation section above in a 35-acre rectangular field 500. Within the field a square of 10 acres 700 (660 feet per side) had a unit placed at its center. Plant locations were marked off along lines due North, East, South and West from the center location to the perimeter of the square. The unit was activated on Jul. 20, 2009 and controlled by the inventor during the testing.

Figure 12:
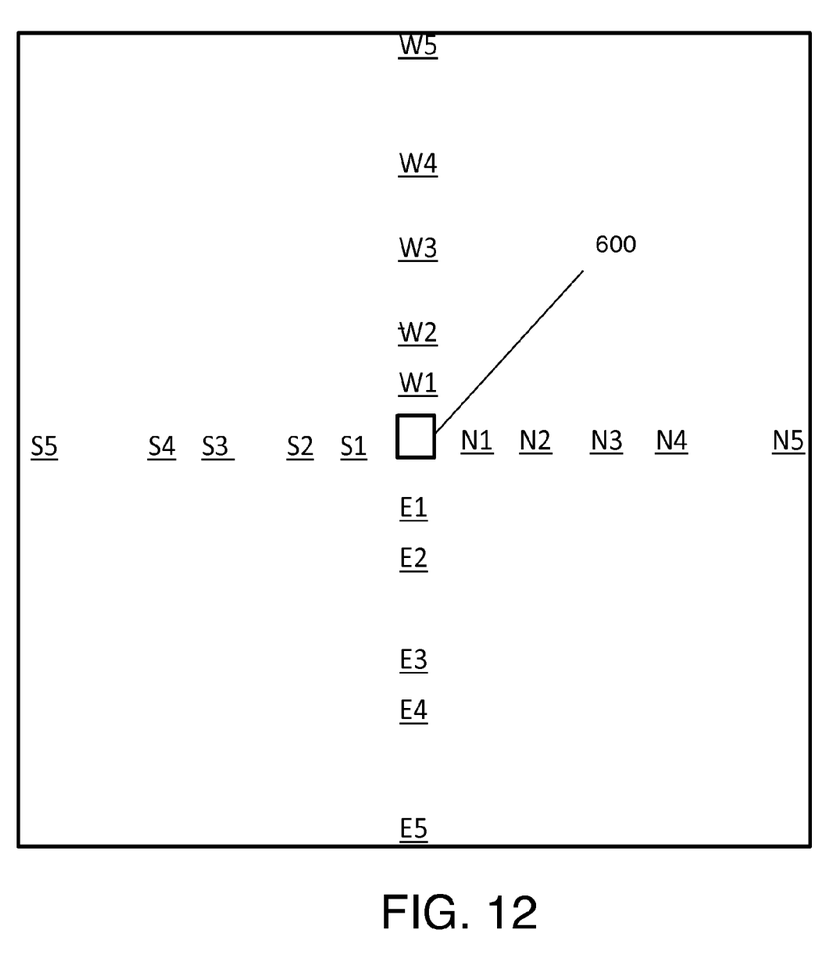
FIG. 12 is the test area of FIG. 11 expanded to show the physical location of test plants and equipment in the test area.

In FIG. 12 the location of five plants per line were marked as plants to be measured in the experiment. Starting from the unit (in each respective compass point direction) the distances from the center were 50 feet, 100 feet, 175 feet, 225 and 330 feet. In addition there were four other plants marked for testing. These four plants were along the same four lines at the four points at which respective line intersects the acre plot perimeter. In FIG. 11 these points are designated A, B, C and D. The 20 plant locations within the square are designated in FIG. 12. The five "West" plant locations are designated W1, W2, W3, W4 and W5. The "East" plant locations are designated E1, E2, E3, E4, and E5 and so on for the North and the South.

The twenty-four marked test plants were measured for over fourteen weeks. Those measurements included counting the tomatoes each week. In addition, in the first few weeks, both the number of flowers and the number of tomatoes were counted twice a week.

Results

Figure 13:
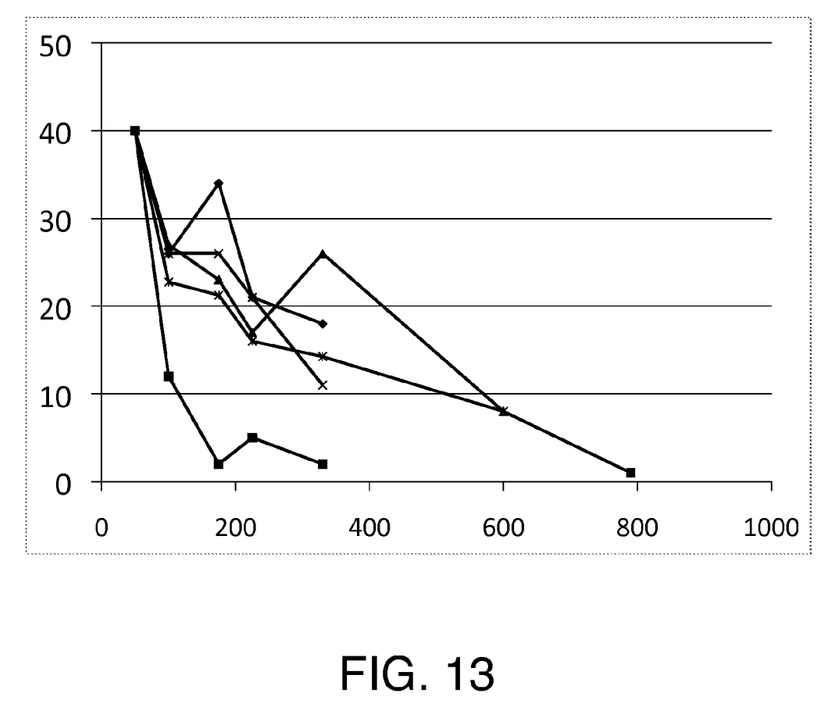
FIG. 13 is a graph showing the number of tomatoes as a function of distance from the unit.
Figure 14:
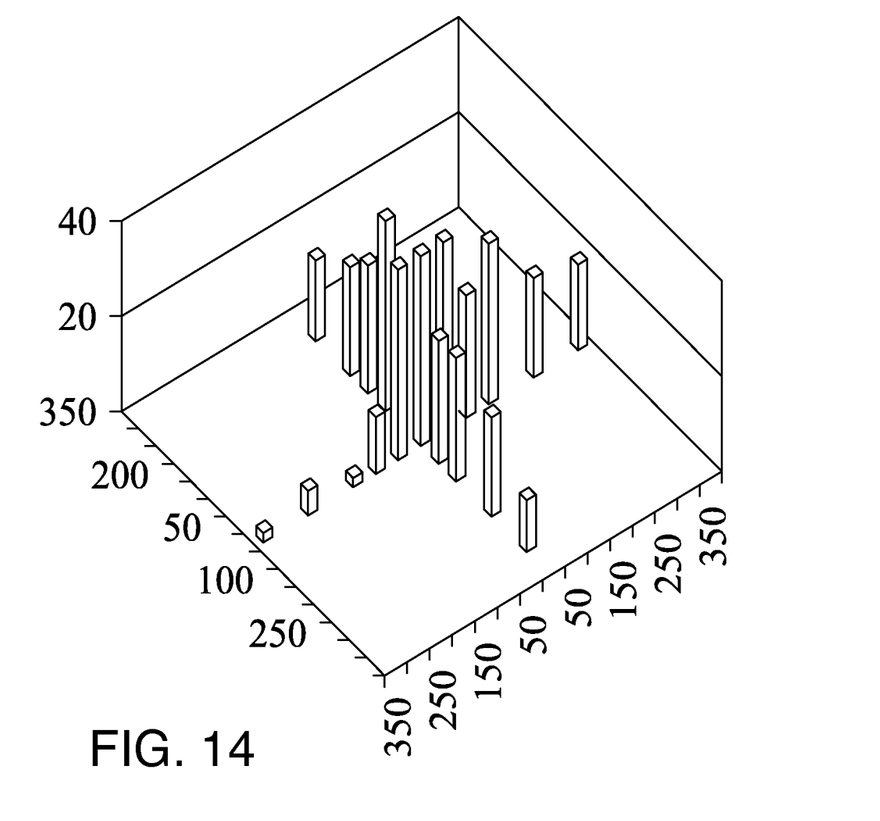
FIG. 14 is the same data as seen in FIG. 13 displayed 2-dimensionally as relative to its position in the field.

The number of tomatoes in the twenty locations on the E-W and N-S lines within the 10 acres is shown in FIG. 13 as a line graph. That figure shows the N 301, S 302, E 303 and W 304 tomato counts as a function of feet from the unit. Also seen is a curve representing the average 305. This graph demonstrates a fall off of the effect of the unit with distance which is consistent with many physical phenomena. The same data is displayed in a three-dimensional format in FIG. 14. The X and Y positions represent the plants' location relative to the unit. The Z heights represent the number of tomatoes on the plant at that location when counted at the end of the experiment.

It can be seen that in all directions there is a general falling off of tomato count as distance from the unit increases.

The other four tomatoes were not at constant distances from the unit since the overall field is rectangular. A and C are at 460 feet, B is at 270 feet, D is at 20 feet. Those data points are also included in the graph of FIG. 13.

Indoors Experiment

A second set of experiments were performed indoors. In fact it was on a balcony of an apartment in Marina Del Rey, Calif. These experiments were performed during 2008. The tests used different plants including Celosia, Tomatoes, and Pepper plants. The plants were sourced in twos from a nearby Home Depot. Plants of similar height and girth were chosen. If one was arguable slightly larger than the other, that one was made the control plant.

The procedure was that the potted plants were placed a few inches apart on a table on the balcony. Lab calibrated beakers were obtained and used to measure water and nutrients that were applied equally to both plants. Every week the plants positions were changed to account for any difference in sunlight.

Each day the test plant was taken to another room inside where a Biowave unit was bolted to the wall. The motors of this machine were set a yard away from the machine itself (to be further from the plant) so that any magnetic field from the motors would not impact on the plants. Also the motors were screened with expanded metal and grounded to further reduce any EM radiation. This was measured with a magnetometer.

The test plant was placed beside the machine for 15 minutes a day and then returned to the balcony. In one test run the test plant had 15 blossoms, while the control plant had 7 blossoms. This experiment was repeated at least 18 times during 2008 with both with of the other plants. All of the tests showed the test plants with greater growth than the control plants.

Figure 15:
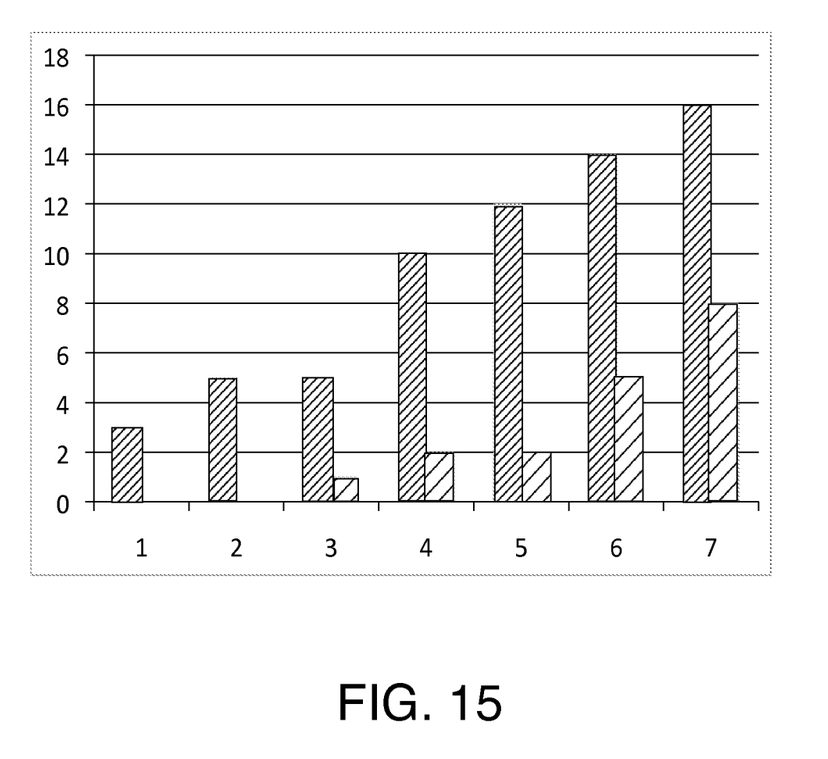
FIG. 15 shows tomato growth using an indoor unit.

Four of the 18 tests were with organic tomatoes. In all these cases the test plant to control plant tomato-count ratio ranged from 4 times to 2. The results of one particular test run are shown in FIG. 15. The more densely hatched columns represent the number of tomatoes on the test plant. The other columns represent the control plant. Both are plotted at one week intervals over seven weeks. Additionally, in at least one documented test run, the test plant also had significantly less insect damage than the control plant.

A tomato from one of the experiment's test plants was analyzed for its Brix content by Silliker Labs of Cypress Calif. The USDA average Brix rating for an organic tomato is 4.9%. The tests performed by this independent lab showed the test tomatoes to have a Brix rating of 10.5%.

Theory of Operation

No particular theory of operation is presented or known. Various known mechanisms may be involved including acoustic waves transmitted through the air or vibrations transmitted through the ground. Gravity is another possible communication medium. The papers mentioned in the background section, "Biochemical and physiological changes in plants as a result of different sonic exposures" by Yu-Chuan Qin, Won-Chu Lee, Young-Cheol Choi and Tae-Wan Kim and "Growth Promotion by Vibration at 50 Hz in Rice and Cucumber Seedlings", by Hideyuki Takahashi, Hiroshi Suge and Tadashi Kato. (Plant Cell Physiol. 32(5): 729-732 (1991)). These and other publications evidence serious researchers studying possibly not-yet-understood factors that can affect plant health and growth.

Publications that teach subtle influences on plant growth include, "Plant gene responses to frequency-specific sound signals" Mi-Jeong Jeong, Chang-Ki Shim, Jin-Ohk Lee, Hawk-Bin Kwon, Yang-Han Kim, Seong-Kon Lee, Myeong-Ok Byun and Soo-Chul Park., "Growth of the Cellular Slime Mold, *Dictyostelium discoideum*, Is Gravity Dependent" Yukishige Kawasaki*, Takeshi Kiryul, Kenji Usui1, and Hiroshi Mizutani, Mitsubishi-Kasei Institute of Life Sciences, 11 Minamiooya, Machida, Tokyo 194, Japan. Another paper showing an effect of music and even less tangible inputs causing differences in plant growth is "Measuring Effects of Music, Noise, and Healing Energy Using a Seed Germination Bioassay" From the journal of alternative and complementary medicine Volume 10, number 1, 2004, pp. 113-122 Katherine Creath, Ph.D. (Optical Science), Ph.D. (Music), 1-3 And Gary E. Schwartz, Ph.D.1, 3.

Still other scholarly papers that may be relevant are from Plant and Cell Physiology, 2002, Vol. 43, No. 6 647-651. "Effects of Mechanical Vibration on Seed Germination of *Arabidopsis thaliana*" (L.) Heynh. Ayuho Uchida1, 3 and Kotaro T. Yamamoto 1, 2, 4. and 1. J Gravit Physiol. 1996 April; 3(1):69-74. Also, "Gravity related features of plant growth behavior studied with rotating machines". Brown A H. Collaborators: Brown A H. University of Pennsylvania (Philadelphia), USA.

Those skilled in the art will recognize that these and other teachings suggest that occurrences proximate to plants may have effects on their growth even though the mechanisms may not be understood. They represent serious researcher's efforts to understand subtle influences on plant germination and growth.

Figure 2A:
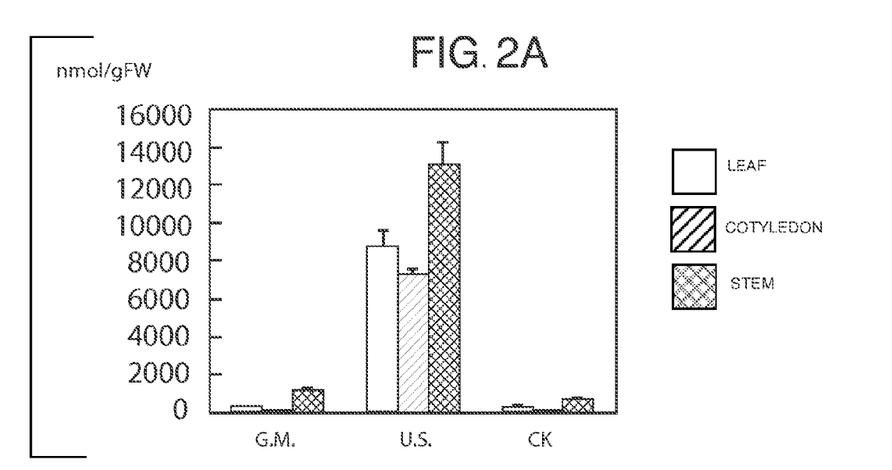
FIGS. 2A and 2B together constitute a re-drawing of FIG. 2 of the paper of Yu-Chuan Qin, et al.
Figure 2B:
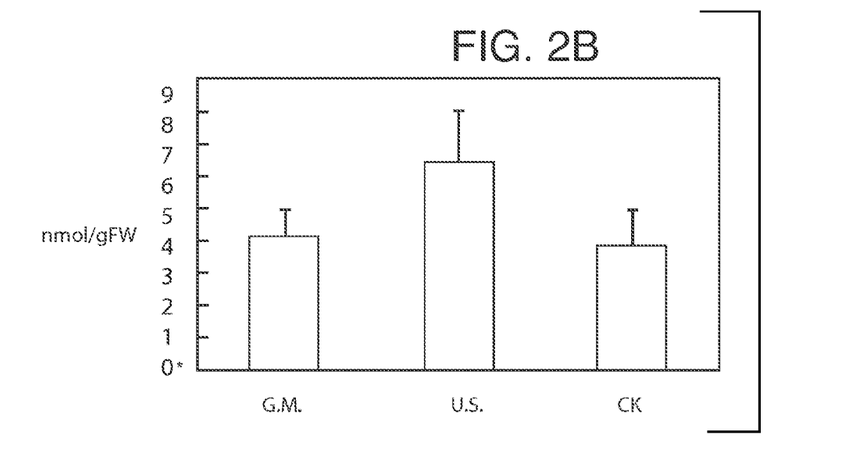

These seven papers mentioned above are hereby incorporated by reference in their entirety. In particular, FIGS. 2A and 2B are reproductions of charts appearing in the paper "Biochemical and physiological changes in plants as a result of different sonic exposures" mentioned above. FIG. 2A shows polyamine content (nmol/gFW) of cucumber seedlings. FIG. 2B shows a mature plant with a different acoustic treatment. Error bars represent the standard deviations of the means of polyamine contents. It can be seen from these figures that the polyamine uptake is greatest in the plants exposed to ultrasound.

Various embodiments with various modifications as are suited to the particular use contemplated are expected. In the following claims, the words "a" and "an" should be taken to mean "at least one" in all cases, even if the wording "at least one" appears in one or more claims explicitly. The scope of the invention is set out in the claims below.

What is claimed:

1. A mechanical apparatus for treating plants comprising:
 a. a base;
 b. an inner space frame armature,
 c. an outer space frame armature of a shape geometrically similar to said inner space frame armature and scaled larger than said inner space-frame armature; further, said inner armature being substantially contained within said outer armature, the inner space frame being scaled down in proportion to the first space frame at a ratio of about 5:4;
 d. an axle, said axle being supported from said base in a vertical orientation with said outer armature rotatably disposed about said axle;
 e. a motive source operatively coupled to said inner armature and;
 f. a motive source operatively coupled to said outer armature;
 said motive sources so constituted and configured and coupled to said respective armatures as to engender said armatures to rotate about the line of said axle in mutually opposite directions when said motive sources are energized and activated, the rotation of the armatures generating acoustic waves;
 further, said armatures each comprise rods constituting the space frame in the form of a set of geometric shapes including an upper and a lower right square pyramid disposed with their respective bases in parallel planes and their apexes such that a line through the apex points would be perpendicular to the planes of their bases;
 still further, the pyramids are mutually spaced apart and rigidly connected to each other by two rods extending from each corner of the upper pyramid to the two respective closest corners of the base of the lower pyramid.

2. The apparatus of claim 1 wherein said at least one motive source comprises an electric motor.

3. The apparatus of claim 1 wherein said at least one motive source comprises a DC motor.

4. The apparatus of claim 1 wherein said at least one motive source comprises wind power.

5. The apparatus of claim 1 wherein said motive source comprises an AC motor.

6. The apparatus of claim 3 further comprising a solar panel operatively coupled to said motors such as to provide energy for said motors.

7. The apparatus of claim 3 wherein the source for energy for the motive force comprises waterpower.

8. The apparatus of claim 1 wherein the motive source operatively coupled to said inner armature is distinct from the motive source operatively coupled to said outer armature.

9. The apparatus of claim 1 so configured as to permit rotational rates of between 250 and 1000 revolutions per minute.

10. The apparatus of claim 1 wherein one or more of the rods are substantially composed of a material from the list consisting of stainless steel and aluminum.

11. The machine of claim 1, wherein the mutual alignment of said pyramids is such that a side of the base of the upper pyramid is at a 45-degree angle to a side of the base of the lower pyramid.

12. A method of treating plants comprising: providing a specific symmetric geometric configuration in the presence of plants; a. rotating a first vertical space frame, of the specific symmetric geometric configuration, about its vertical center line;
 b. rotating a second vertical space frame of substantially the same shape as the first space frame and that has a common center line with the first vertical space frame, wherein the second space frame is scaled down in proportion to the first space frame at a ratio of about 5:4; wherein the rotation of the first vertical space frame and the rotation of the second space frame are in opposite directions, the rotation of the space frames generating acoustic waves;

and wherein the specific symmetric geometric configuration has the following properties:
i. rotationally symmetric with 4-fold symmetry about its vertical center line;
ii. includes congruent, opposed, geometric configurations at its upper and lower extremities.

13. The method of claim 12 wherein the space frames of the specific symmetric geometric configuration comprise a set of geometric shapes including an upper and a lower right square pyramid disposed with their respective bases in parallel planes and their apexes such that a line through them would be perpendicular to the planes of their bases;

further, the mutual alignment of said pyramids is such that a side of the base of the upper pyramid is at a 45-degree angle to a side of the base of the lower pyramid;

still further, the pyramids are mutually spaced apart and rigidly connected to each other by two rods extending from each corner of the upper pyramid to the two respective closest corners of the base of the lower pyramid.

14. The method of claim 12 wherein the respective rotational rates are each between about 400 and 500 revolutions per minute.

15. The method of claim 12 wherein the ratio of rods comprising a pyramid to rods connecting pyramids to each other is about between about 1:1.8 and 1:2.

16. The method of claim 12 wherein at least one of the rotational rates is between about 400 and 500 revolutions per minute.

17. The method of claim 12 wherein at least one of the rotational rates is between about 100 and 2000 revolutions per minute.

18. The method of claim 12, wherein the congruent, opposed, configurations are square right pyramids.

* * * * *